United States Patent
Ito et al.

(10) Patent No.: US 12,502,623 B2
(45) Date of Patent: Dec. 23, 2025

(54) EVAPORATION CONCENTRATION MECHANISM AND METHOD FOR CONTROLLING SAME

(71) Applicant: HITACHI HIGH-TECH CORPORATION, Tokyo (JP)

(72) Inventors: Mayuko Ito, Tokyo (JP); Shinya Matsuoka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 171 days.

(21) Appl. No.: 18/272,150

(22) PCT Filed: Jan. 6, 2022

(86) PCT No.: PCT/JP2022/000193
§ 371 (c)(1),
(2) Date: Jul. 13, 2023

(87) PCT Pub. No.: WO2022/185707
PCT Pub. Date: Sep. 9, 2022

(65) Prior Publication Data
US 2024/0066426 A1   Feb. 29, 2024

(30) Foreign Application Priority Data

Mar. 3, 2021  (JP) .................. 2021-033290

(51) Int. Cl.
*B01D 1/00*  (2006.01)
(52) U.S. Cl.
CPC .................. *B01D 1/0082* (2013.01)
(58) Field of Classification Search
CPC .................. B01D 1/0082; G01N 1/4022
See application file for complete search history.

(56) References Cited

U.S. PATENT DOCUMENTS 7,418,952 B2 * 9/2008 Kano ............... F02D 41/0045
                                                      73/114.39
7,935,536 B2 * 5/2011 Johnson ............... B01D 71/32
                                                      422/50

(Continued)

FOREIGN PATENT DOCUMENTS

JP          51-2992 U    1/1976
JP          8-89705 A    4/1986

(Continued)

OTHER PUBLICATIONS

Extended European Search Report received in corresponding European Application No. 22762766.8 dated Dec. 5, 2024.

(Continued)

*Primary Examiner* — Jonathan Miller
(74) *Attorney, Agent, or Firm* — MATTINGLY & MALUR, PC

(57) ABSTRACT

An evaporation concentration mechanism is realized that can control a depressurization rate by an inexpensive and simple mechanism to inhibit bumping at the time of evaporation and concentration. The evaporation concentration mechanism includes a reaction vessel that holds a sample solution, a depressurization channel connected to the reaction vessel, and a depressurization source that is connected to the reaction vessel via the depressurization channel and depressurizes the inside of the reaction vessel. The evaporation concentration mechanism further includes at least one of solenoid valves provided in the depressurization channel, and a control unit 8 that controls an operation of the solenoid valves. The control unit 8 intermittently opens and closes the solenoid valves during a depressurization period in which the inside of the reaction vessel is depressurized by the depressurization source.

9 Claims, 4 Drawing Sheets

(56) References Cited

U.S. PATENT DOCUMENTS

| | | | |
|---|---|---|---|
| 8,857,279 B2* | 10/2014 | Hanson | B01D 61/145 |
| | | | 210/651 |
| 10,989,634 B2* | 4/2021 | Komarek | G01N 1/4022 |
| 2007/0026380 A1* | 2/2007 | Johnson | B01D 69/02 |
| | | | 435/287.1 |
| 2007/0193871 A1* | 8/2007 | Wiseman | B01D 1/2896 |
| | | | 202/185.3 |
| 2008/0230370 A1* | 9/2008 | Noro | B01D 1/16 |
| | | | 203/91 |
| 2021/0055191 A1* | 2/2021 | Komarek | B01J 20/14 |
| 2021/0187413 A1* | 6/2021 | Marienau | B01D 11/0284 |
| 2022/0268798 A1* | 8/2022 | Ebihara | G01N 35/0098 |

FOREIGN PATENT DOCUMENTS

| | | |
|---|---|---|
| JP | 2001-276501 A | 10/2001 |
| JP | 2008-237943 A | 10/2008 |
| JP | 2010-266086 A | 11/2010 |
| JP | 2011-017566 A | 1/2011 |
| JP | 2015-128744 A | 7/2015 |
| WO | 2016-125810 A1 | 8/2016 |
| WO | 2021/002431 A1 | 1/2021 |

OTHER PUBLICATIONS

International Search Report of PCT/JP2022/000193 dated Mar. 1, 2022.

* cited by examiner

[FIG. 1]
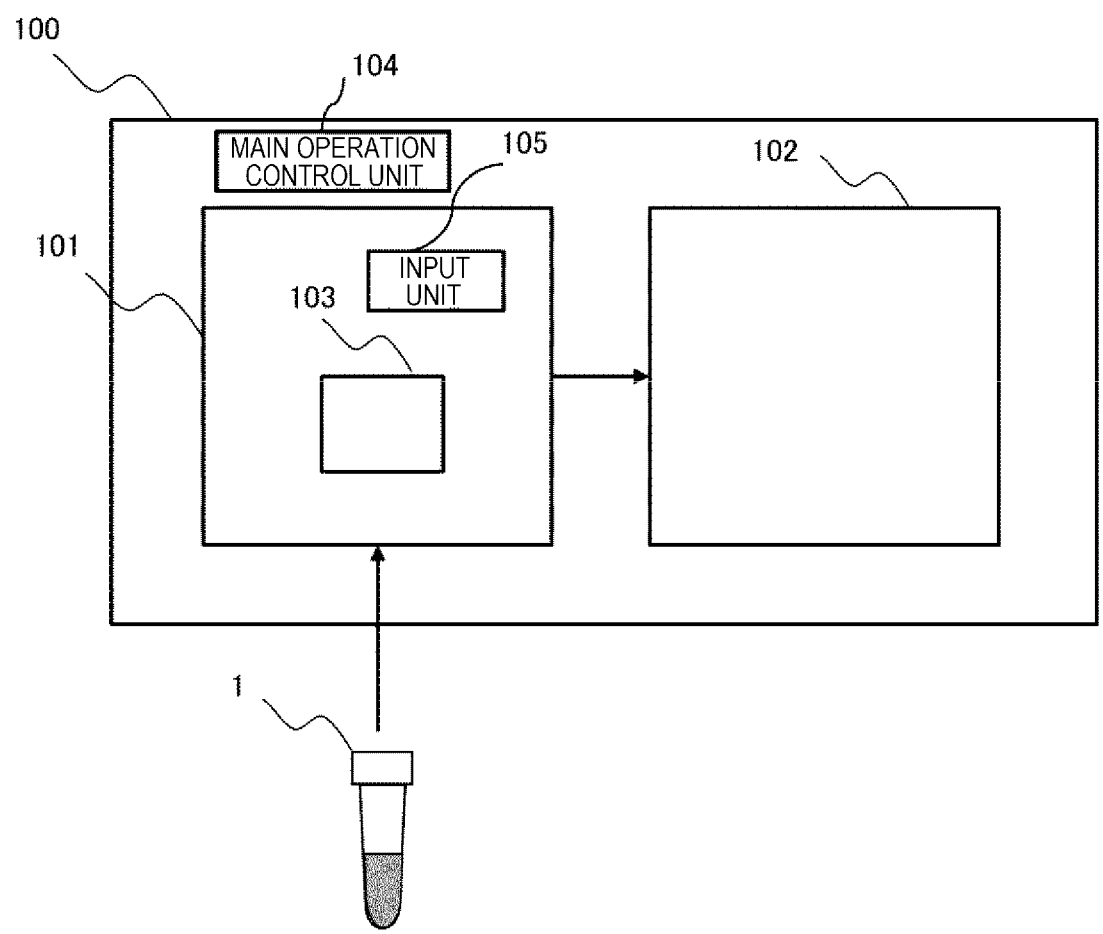

[FIG. 2]
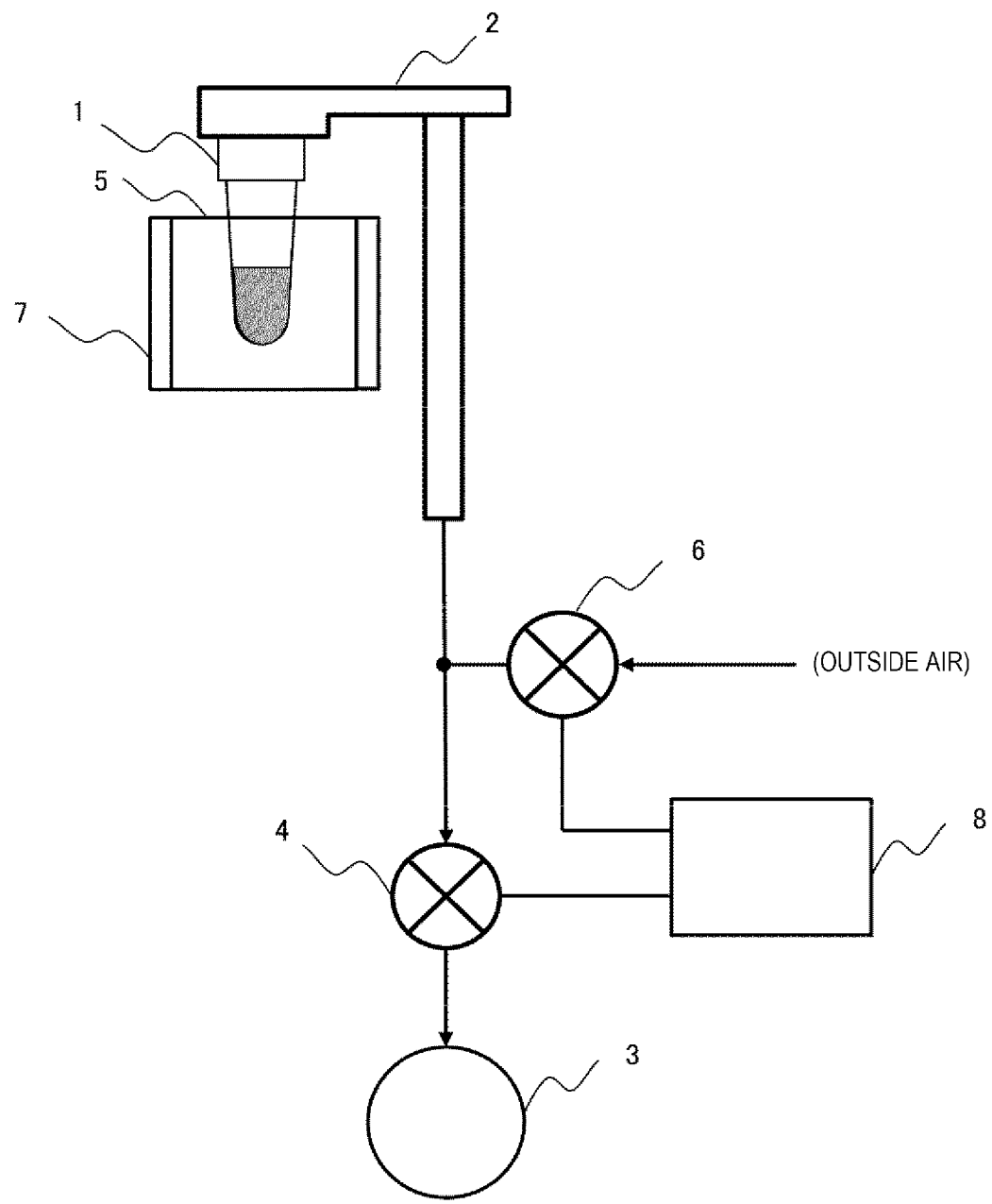

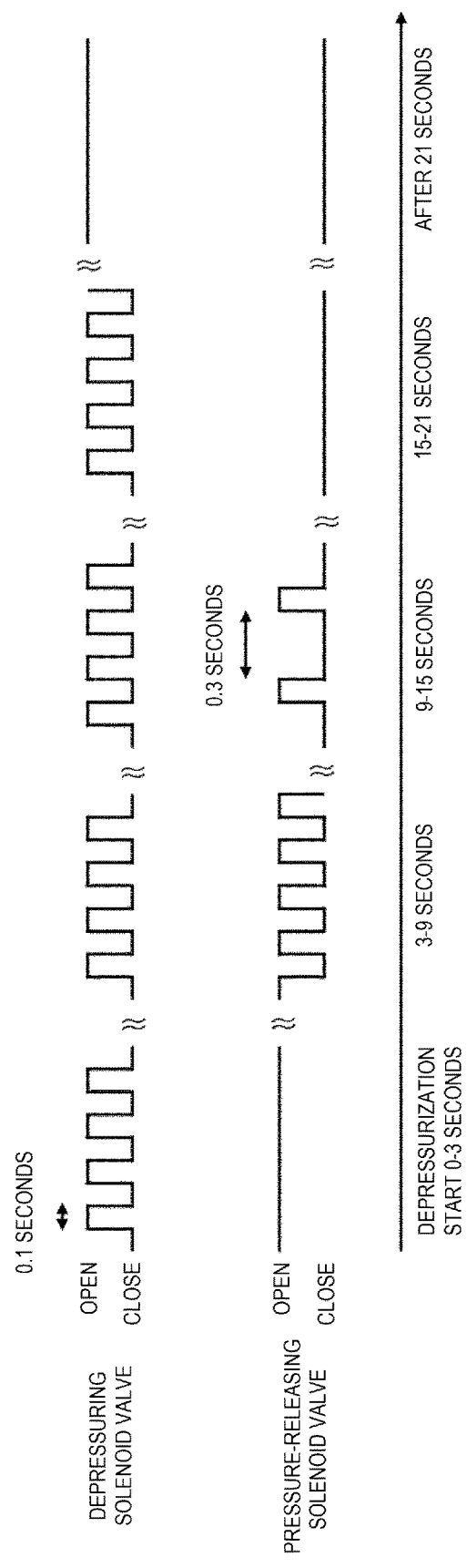
[FIG. 3]

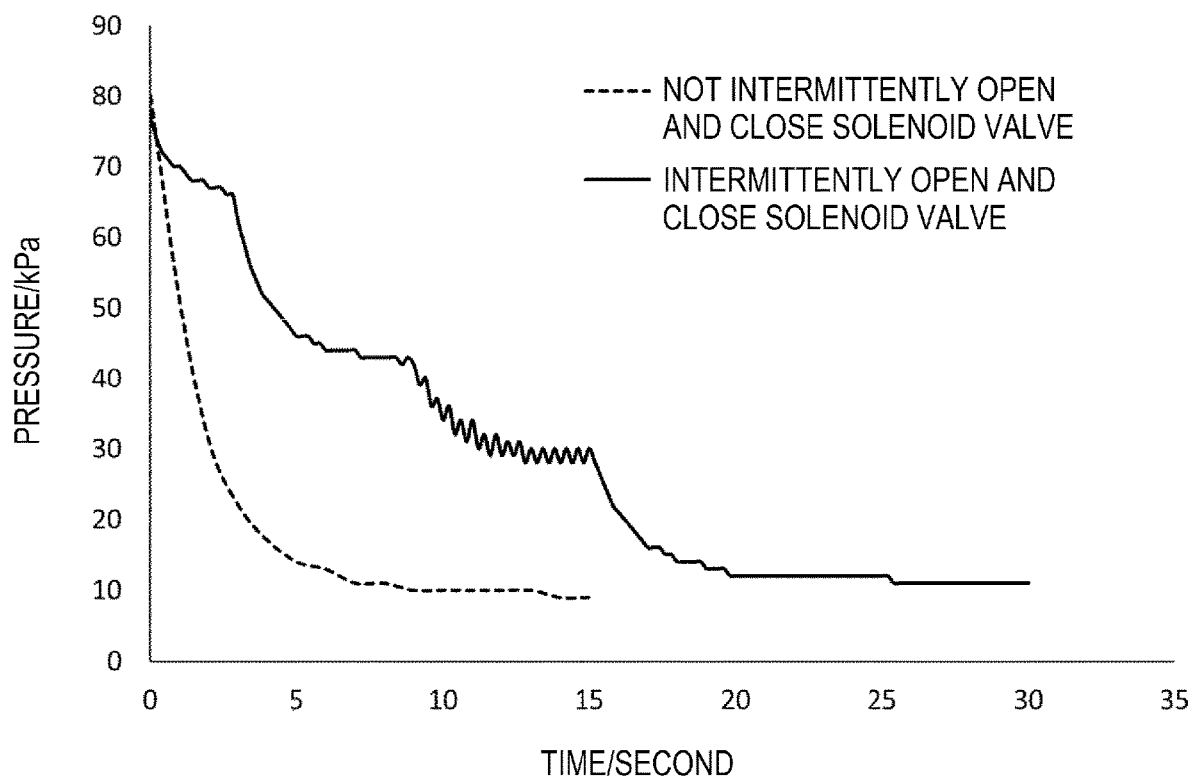
[FIG. 4]

EVAPORATION CONCENTRATION MECHANISM AND METHOD FOR CONTROLLING SAME

TECHNICAL FIELD

The present invention relates to an evaporation concentration mechanism which evaporates a solvent in a sample solution for executing an evaporation concentration process as preprocessing before measurement to be performed by an analyzer, and a method for controlling the evaporation concentration mechanism.

BACKGROUND ART

For the purpose of improving sensitivity in analysis, and removing an organic solvent, an evaporation concentration process has been executed by evaporating the solvent in a sample that contains substance to be analyzed to increase concentration of the substance. A method for controlling a depressurization rate in the evaporation concentration process has been implemented for preventing a bumping that may occur in the evaporation concentration process. Patent Literature 1 discloses an apparatus as a technique for executing a depressurization control in the evaporation concentration process. Specifically, the apparatus is configured to connect a gas supplier capable of supplying gas to the line between the vessel for storing the sample to be concentrated and the depressurization source so that the magnitude of the pressure during depressurization is adjusted in accordance with a gas supply amount.

CITATION LIST

Patent Literature

Patent Literature 1: Japanese Unexamined Patent Application Publication No. 2015-128744

SUMMARY OF INVENTION

Technical Problem

The preprocessing executed in an automatic analyzer requires increase in the concentration of the substance to be analyzed by evaporating the solvent of the sample so that sensitivity is improved. In this case, bumping may occur when executing the evaporation concentration process under rapid depressurization and heating conditions. The bumping results in a loss of the substance to be analyzed, and deterioration in accuracy of evaporation amount. According to the technique as disclosed in Patent Literature 1, the inflow of gas such as a nitrogen gas serves to control the depressurization rate to attain suppression of the bumping.

The concentration device as disclosed in Patent Literature 1 needs the device for supplying gas such as the nitrogen gas, which is complex in structure and costly. It is therefore difficult for the concentration device disclosed in Patent Literature 1 to be installed in the automatic analyzer in view of the cost and complexity. Having been made in light of the problems as described above, it is an object of the present invention to provide an evaporation concentration mechanism that allows control of the depressurization rate using the inexpensive and simple mechanism for suppressing the bumping in the evaporation concentration process, and a method for controlling the evaporation concentration mechanism.

Solution to Problem

In order to attain the object, the present invention is configured as below.

An evaporation concentration mechanism includes a reaction vessel holding a sample solution, a depressurization channel connected to the reaction vessel, and a depressurization source connected to the reaction vessel via the depressurization channel and configured to depressurize the inside of the reaction vessel. The evaporation concentration mechanism further includes at least one solenoid valve provided in the depressurization channel, and a control unit configured to control an operation of the solenoid valve. The control unit is configured to intermittently open and close the solenoid valve during a depressurization period in which the inside of the reaction vessel is depressurized by the depressurization source.

With a method for controlling an evaporation concentration mechanism that depressurizes and concentrates a sample solution held in a reaction vessel by a depressurization source via a depressurization channel, the depressurization source is operated to depressurize the inside of the reaction vessel, at least one solenoid valve that is provided in the depressurization channel is intermittently opened and closed during a depressurization period in which the inside of the reaction vessel is depressurized by the depressurization source, and the sample solution is depressurized and concentrated.

Advantageous Effect of Invention

The present invention provides the evaporation concentration mechanism capable of controlling the depressurization rate using the inexpensive and simple mechanism for suppressing the bumping in the evaporation concentration process, and the method for controlling the evaporation concentration mechanism.

BRIEF DESCRIPTION OF DRAWINGS

FIG. 1 is a schematic diagram showing an overall configuration of an automatic analyzer according to a first embodiment.

FIG. 2 is a schematic diagram showing a configuration of an evaporation concentration mechanism according to the first embodiment.

FIG. 3 is a diagram showing an example of opening and closing patterns of a depressurizing solenoid valve and a pressure-releasing solenoid valve at the time of evaporation and concentration according to the first embodiment.

FIG. 4 is a graph showing a pressure change when the depressurizing solenoid valve and the pressure-releasing solenoid valve are intermittently opened and closed, and a pressure change when the depressurizing solenoid valve and the pressure-releasing solenoid valve are not intermittently opened and closed.

DESCRIPTION OF EMBODIMENTS

An embodiment according to the present invention will be described referring to the drawings.

EMBODIMENT

First Embodiment

A configuration according to a first embodiment will be described referring to FIG. 1 and FIG. 2.

FIG. 1 is a schematic diagram showing an overall configuration of an automatic analyzer 100 according to the first embodiment. Referring to FIG. 1, the automatic analyzer 100 includes a main operation control unit 104 for controlling entire operations of the automatic analyzer 100, a preprocessing unit 101, and an analysis unit 102. The preprocessing unit 101 includes an evaporation concentration mechanism 103 and an input unit 105.

An operator places a reaction vessel 1 that stores a sample solution containing a sample to be analyzed in the preprocessing unit 101. The preprocessing unit 101 executes preprocessing for analysis by adding a reaction reagent to the sample solution stored in the reaction vessel 1, and refining the sample solution. In the preprocessing, the evaporation concentration mechanism 103 evaporates only a solvent in the sample solution to increase the concentration of the sample to be analyzed in the sample solution. The preprocessed sample solution is supplied to the analysis unit 102 where analysis is performed.

FIG. 2 is a schematic diagram showing a configuration of the evaporation concentration mechanism. Referring to FIG. 2, the evaporation concentration mechanism includes a depressurization channel 2 for depressurizing the inside of the reaction vessel 1 for holding the sample solution, a depressurizing solenoid valve 4, a depressurization source 3, and a control unit 8 for controlling an open-close operation of the depressurizing solenoid valve 4.

The reaction vessel 1 is connected to one end of the depressurization channel 2. The depressurization source 3 is connected to the other end of the depressurization channel 2, and connected to the reaction vessel 1 via the depressurization channel 2. One side of the depressurizing solenoid valve 4 is connected to a channel of the depressurization channel 2 in a side of the reaction vessel 1, and the other side of the depressurizing solenoid valve 4 is connected to a channel of the depressurization channel 2 in a side of the depressurization source 3. The depressurization source 3 is operated to cause the depressurization channel 2 to depressurize the inside of the reaction vessel 1 so that the solvent in the sample solution is evaporated for evaporation and concentration.

For example, the depressurization source 3 may be a vacuum pump. Execution or non-execution of depressurization is controlled by the control unit 8 of the evaporation concentration mechanism, which opens and closes the depressurizing solenoid valve 4 disposed in the depressurization channel. The control unit 8 may be provided for the exclusive use by the evaporation concentration mechanism, or shared by other mechanisms.

Additionally, a vessel holding portion 5 for holding the reaction vessel 1 may be provided. A pressure-releasing solenoid valve 6 may be provided in the middle of the depressurization channel 2. One side of the pressure-releasing solenoid valve 6 is connected to the depressurization channel 2 between the reaction vessel 1 and the depressurizing solenoid valve 4, and the other side of the pressure-releasing solenoid valve 6 is opened to the atmosphere. The pressure-releasing solenoid valve 6 is opened to cause the depressurization channel 2 to be opened to the atmosphere.

A heating means (vessel heating unit) 7 that heats the reaction vessel 1 may be provided for enhancing efficiency of evaporation. For example, the heating means 7 may be a heater.

A procedure for executing the evaporation concentration process will be described. The reaction vessel 1 that contains the sample solution is placed in the vessel holding portion 5. The operator operates an input unit 105 to instruct the control unit 8 of the evaporation concentration mechanism to start the evaporation concentration process. The automatic analyzer may be configured to automate this process. In such a case, the evaporation concentration process is automatically started in accordance with execution or non-execution of the evaporation concentration process, which has been determined for each sample to be analyzed. In response to the instruction, the control unit 8 opens the depressurizing solenoid valve 4 to cause depressurization of the reaction vessel 1 by the depressurization source 3, and starts the evaporation concentration process.

The evaporation concentration process is executed until the solvent in the sample stored in the reaction vessel 1 decreases to reach the target amount. The control unit 8 then closes the depressurizing solenoid valve 4 to finish the evaporation concentration process. A period from start to the end of depressurization in the time taken for executing the evaporation concentration process is called a depressurization period for convenience of explanation. In the depressurization period, the control unit 8 intermittently opens and closes the depressurizing solenoid valve 4. Whether or not the solvent in the sample has been decreased to reach the target amount is determined based on the time elapsing from the start of the evaporation concentration process. The control unit 8 makes a determination with respect to the elapse of time. The depressurization period includes a first depressurization period, a second depressurization period, a third depressurization period, and a fourth depressurization period.

A method for controlling depressurization in the evaporation concentration process (method for controlling the evaporation concentration mechanism) will be described referring to FIG. 3 and FIG. 4.

FIG. 3 is a diagram showing an example of controlling open-close operations of the depressurizing solenoid valve 4 and the pressure-releasing solenoid valve 6 (example of an open-close pattern) in the evaporation concentration process. As FIG. 3 illustrates, in 3 seconds (first depressurization period) elapsing from the start of depressurization, the depressurizing solenoid valve 4 is operated at a frequency of opening for 0.1 seconds and closing for 0.1 seconds, and the pressure-releasing solenoid valve 6 is kept opened. In the period from 3 seconds elapsing from the start of depressurization to 9 seconds (second depressurization period), and the period from 9 seconds to 15 seconds (third depressurization period), an open-close frequency of the depressurizing solenoid valve 4 is not changed. In the period from 3 seconds elapsing from the start of depressurization to 9 seconds (second depressurization period), the pressure-releasing solenoid valve 6 is operated at a frequency of opening for 0.1 seconds, and closing for 0.1 seconds. In the period from 9 seconds to 15 seconds (third depressurization period), the pressure-releasing solenoid valve 6 is operated at the frequency of opening for 0.1 seconds and closing for 0.3 seconds.

In the period from 15 seconds elapsing from the start of depressurization to 21 seconds (fourth depressurization period), the open-close frequency of the depressurizing solenoid valve 4 is not changed, and the pressure-releasing solenoid valve 6 is kept closed. In the period from 21 seconds elapsing from the start of depressurization onward, the depressurizing solenoid valve 4 is kept opened, and the pressure-releasing solenoid valve 6 is kept closed.

Each degree of depressurization in the depressurization channel 2 and the reaction vessel 1 is controlled by changing each open-close frequency of the depressurizing solenoid valve 4 and the pressure-releasing solenoid valve 6 stepwise from the start of depressurization.

Each length of time for opening and closing the depressurizing solenoid valve 4 and the pressure-releasing solenoid valve 6 can be arbitrarily set individually in accordance with the target depressurization degree. Each length of time for opening and closing those solenoid valves is set to be within 1 second to attain a gentle change in depressurization.

The number of open-close patterns of each of the depressurizing solenoid valve 4 and the pressure-releasing solenoid valve 6 is preliminarily set to 1 or more in the control unit 8. The open-close pattern may be arbitrarily set in accordance with a sample solution amount at the start of evaporation, the sample solution property, and a target solvent evaporation amount. The open-close pattern includes a start-end timing of the open-close operation in addition to each period for opening and closing the depressurizing solenoid valve 4 and the pressure-releasing solenoid valve 6.

FIG. 4 is a graph showing a pressure change in the case where the depressurizing solenoid valve 4 and the pressure-releasing solenoid valve 6 are intermittently opened and closed in accordance with the open-close pattern as shown in FIG. 3, and a pressure change in the case where those valves are not intermittently opened and closed. Referring to FIG. 4, a Y-axis represents the pressure/kPa, and an X-axis represents the time/second. A solid line represents the pressure change in the case where the solenoid valves are intermittently opened and closed, and a broken line represents the pressure change in the case where the solenoid valves are not intermittently opened and closed.

As FIG. 4 indicates, depressurization may be gently changed by opening and closing the depressurizing solenoid valve 4 and the pressure-releasing solenoid valve 6 highly frequently. The present invention is implemented to allow suppression of the bumping caused by the rapid pressure change in the evaporation concentration process.

It is possible to control the depressurization change by opening and closing only the depressurizing solenoid valve 4 without using the pressure-releasing solenoid valve 6. In the case of controlling by opening and closing only the depressurizing solenoid valve 4, the open-close pattern as shown in FIG. 3 allows execution of the open-close control only of the depressurizing solenoid valve 4. Other open-close patterns except the one as shown in FIG. 3 also allow execution of the open-close control only of the depressurizing solenoid valve 4.

When opening and closing both the depressurizing solenoid valve 4 and the pressure-releasing solenoid valve 6, each open-close pattern can be set for the depressurizing solenoid valve 4 and the pressure-releasing solenoid valve 6 individually. This makes it possible to change depressurization more gently, and to control the timing and the degree of depressurization more finely in comparison with the case of opening and closing only of the depressurizing solenoid valve 4.

In a modification of the first embodiment, the depressurizing solenoid valve 4 is kept opened, and the pressure-releasing solenoid valve 6 is intermittently opened and closed in the depressurization period to securely control depressurization to be gently changed.

In another modification of the first embodiment, the pressure-releasing solenoid valve 6 is only provided by omitting the depressurizing solenoid valve 4. One side of the pressure-releasing solenoid valve 6 is connected to a channel of the depressurization channel in the side of the reaction vessel 1, and the other side of the pressure-releasing solenoid valve 6 is opened to the atmosphere. The pressure-releasing solenoid valve 6 is intermittently opened and closed to securely control depressurization to be gently changed. The concept of the open-close pattern of the pressure-releasing solenoid valve 6 as described in the first embodiment applies to the open-close pattern of the pressure-releasing solenoid valve 6 in the above-described modifications. In other words, as time is elapsed from the start of depressurization, the time for holding the open state of the pressure-releasing solenoid valve 6 may be gradually reduced.

Each of the open period and the close period of the repetitive open-close operations of the depressurizing solenoid valve 4 is set to be within 1 second. Each of the open period and the close period of the repetitive open-close operations of the pressure-releasing solenoid valve 6 is set to be within 1 second.

In the example as described above, the depressurization period is constituted by four periods, specifically, the first depressurization period, the second depressurization period, the third depressurization period, and the fourth depressurization period. However, the number of depressurization periods may be smaller than 4, or equal to or larger than 5.

In the first embodiment of the present invention, it is possible to provide the evaporation concentration mechanism capable of controlling the depressurization rate using the inexpensive and simple mechanism for suppressing the bumping in the evaporation concentration process, and the method for controlling the evaporation concentration mechanism. It is also possible to provide the automatic analyzer having the above-described evaporation concentration mechanism.

The present invention is not limited to the embodiment as described above, but includes various modifications. The present invention is not necessarily limited to the one equipped with all structures as described above. In the embodiment as described above, the evaporation concentration mechanism has been described as apart of the preprocessing unit of the automatic analyzer. It is possible to assemble the evaporation concentration mechanism according to the present invention with the sample processing device separated from the analyzer. The depressurizing solenoid valve 4 and the pressure-releasing solenoid valve 6 may be collectively referred to as the solenoid valve.

LIST OF REFERENCE SIGNS

1 . . . reaction vessel, 2 . . . depressurization channel, 3 . . . depressurization source, 4 . . . depressurizing solenoid valve, 5 . . . vessel holding portion, 6 . . . pressure-releasing solenoid valve, 7 . . . heating means, 8 . . . control unit, 100 . . . automatic analyzer, 101 . . . preprocessing unit, 102 . . . analysis unit, 103 . . . evaporation concentration mechanism, 104 . . . main operation control unit, 105 . . . input unit

The invention claimed is:

1. An evaporation concentration mechanism, comprising:
a reaction vessel holding a sample solution;
a depressurization channel connected to the reaction vessel; and
a depressurization source connected to the reaction vessel via the depressurization channel and configured to depressurize the inside of the reaction vessel,
the evaporation concentration mechanism further comprising:
a depressurizing solenoid valve having one side connected to a channel of the depressurization channel in a side of the reaction vessel, and the other side connected to a channel of the depressurization channel in a side of the depressurization source; and a pressure-releasing solenoid valve having one side connected to the depressurization channel between the reaction vessel and the depressurizing solenoid valve, and the other side opened to the atmosphere; and a control unit for preliminarily setting one or more open-close patterns of the pressurizing solenoid valve and the pressure-releasing solenoid valve during a depressurization period for depressurizing the inside of the reaction vessel by the depressurization source, the control unit controlling each opening and closing of the depressurizing solenoid valve and the pressure-releasing solenoid valve in accordance with a set pattern, wherein the open-close pattern is used for intermittently opening and closing the depressurizing solenoid valve, and for holding the pressure-releasing solenoid valve in an open state during the depressurization period, and wherein the open-close pattern is used for holding the depressurizing solenoid valve in an open state, and intermittently opening and closing the pressure-releasing solenoid valve during the depressurization period.

2. The evaporation concentration mechanism according to claim 1, wherein the pattern is set in accordance with a sample solution amount at the start of evaporation, a property of the sample solution, and a target solvent evaporation amount.

3. The evaporation concentration mechanism according to claim 1, wherein the depressurization period is divided into a plurality of periods, and the pattern is changed for each of the divided periods.

4. The evaporation concentration mechanism according to claim 1, wherein each of an open period and a close period of the depressurizing solenoid valve and the pressure-releasing solenoid valve during the depressurization period is within 1 second.

5. The evaporation concentration mechanism according to claim 1, wherein the evaporation concentration mechanism is disposed in a preprocessing unit of an automatic analyzer that includes the preprocessing unit configured to preprocess the sample solution and an analysis unit configured to analyze a sample to be analyzed in the sample solution.

6. A method for controlling an evaporation concentration mechanism that includes a reaction vessel holding a sample solution, a depressurization channel connected to the reaction vessel, a depressurization source connected to the reaction vessel via the depressurization channel and configured to depressurize the inside of the reaction vessel, the evaporation concentration mechanism further comprising a depressurizing solenoid valve having one side connected to a channel of the depressurization channel in a side of the reaction vessel, and the other side connected to a channel of the depressurization channel in a side of the depressurization source, and a pressure-releasing solenoid valve having one side connected to the depressurization channel between the reaction vessel and the depressurizing solenoid valve, and the other side opened to the atmosphere, wherein a set pattern is selected from one or more open-close patterns of the depressurizing solenoid valve and the pressure-releasing solenoid valve during a depressurization period for depressurizing the inside of the reaction vessel by the depressurization source are preliminarily set to control each opening and closing of the depressurizing solenoid valve and the pressure-releasing solenoid valve in accordance with the set pattern, accordance with a set pattern, wherein the open-close pattern is used for intermittently opening and closing the depressurizing solenoid valve, and for holding the pressure-releasing solenoid valve in an open state during the depressurization period, and wherein the open-close pattern is used for holding the depressurizing solenoid valve in an open state, and intermittently opening and closing the pressure-releasing solenoid valve during the depressurization period.

7. The method for controlling an evaporation concentration mechanism according to claim 6, wherein the pattern is set in accordance with a sample solution amount at the start of evaporation, a property of the sample solution, and a target solvent evaporation amount.

8. The method for controlling an evaporation concentration mechanism according to claim 6, wherein the depressurization period is divided into a plurality of periods, and the pattern is changed for each of the divided periods.

9. The method for controlling an evaporation concentration mechanism according to claim 6, wherein each of an open period and a close period of the depressurizing solenoid valve and the pressure-releasing solenoid valve during the depressurization period is within 1 second.

* * * * *